US007009809B2

(12) United States Patent
Hanssen

(10) Patent No.: US 7,009,809 B2
(45) Date of Patent: *Mar. 7, 2006

(54) CLAMP RETENTION APPARATUS FOR ROTATIONAL DISK DRIVE COMPONENTS

(75) Inventor: Steven A. Hanssen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/105,147

(22) Filed: Apr. 13, 2005

(65) Prior Publication Data
US 2005/0174684 A1 Aug. 11, 2005

Related U.S. Application Data

(63) Continuation of application No. 10/150,596, filed on May 17, 2002, now Pat. No. 6,943,986.

(51) Int. Cl.
G11B 17/02 (2006.01)
(52) U.S. Cl. .................................... 360/99.12
(58) Field of Classification Search ............ 360/99.12, 360/99.06, 98.08, 98.05
See application file for complete search history.

(56) References Cited

U.S. PATENT DOCUMENTS

| 5,138,524 | A | | 8/1992 | Smithers |
| 5,249,090 | A | * | 9/1993 | Fehse ....................... 360/98.08 |
| 5,587,889 | A | | 12/1996 | Sacherman |
| 5,590,025 | A | | 12/1996 | Clemens |
| 5,877,571 | A | * | 3/1999 | Brooks ..................... 360/99.12 |
| 5,940,244 | A | * | 8/1999 | Canlas et al. ............ 360/98.08 |
| 6,040,649 | A | * | 3/2000 | Horng ......................... 310/91 |
| 6,040,980 | A | | 3/2000 | Johnson |
| 6,055,123 | A | * | 4/2000 | Kazmierczak et al. ... 360/98.08 |
| 6,172,870 | B1 | | 1/2001 | Novotny |
| 6,212,031 | B1 | | 4/2001 | Kazmierczak et al. |
| 6,504,673 | B1 | * | 1/2003 | Choo et al. .............. 360/98.08 |
| 6,567,238 | B1 | * | 5/2003 | Renken et al. ........... 360/99.12 |
| 6,757,132 | B1 | | 6/2004 | Watson et al. |

* cited by examiner

Primary Examiner—Allen Cao
(74) Attorney, Agent, or Firm—Bracewell & Giuliani LLP

(57) ABSTRACT

An apparatus for securing the internal rotational components of a disk drive utilizes an annular clamp retention device. The clamp retention device has a rigid, metallic, main ring body from which protrudes a plurality of compliant tabs having a generally L-shaped cross-section. The compliant tabs extend radially inward from the body to form an inner circular array of the tabs. In addition, a plurality of rigid planar flanges, which are larger than the compliant tabs, extend radially outward from the body. The compliant tabs are designed to engage the hub and cartridge of the disk drive rotational components at the upper end of the disk stack.

3 Claims, 2 Drawing Sheets

CLAMP RETENTION APPARATUS FOR ROTATIONAL DISK DRIVE COMPONENTS

RELATED APPLICATIONS

This Continuation Application claims the priority of parent application Ser. No. 10/150,596, filed on May 17, 2002, now U.S. Pat. No. 6,943,986 and entitled "Clamp Retention Apparatus for Rotational Disk Drive Components."

BACKGROUND OF THE INVENTION

1. Technical Field

The present invention relates in general to an improved retention device, and in particular to an improved part interface design for securing and retaining the internal rotational components of a disk drive.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

As stated above, the disks of the disk drive typically are mounted to the rotary spindle with the assistance of some form of fasteners, such as screws. Such fasteners require the assemblers of the disk drives to use hand tools or the like to complete the assembly. Morever, fasteners can introduce small but significant amounts contamination into the sensitive interior of the disk drive during assembly. Thus, an improved design for securing and retaining the internal rotational components of disk drives which overcomes the limitations of the prior art is needed.

SUMMARY OF THE INVENTION

One embodiment of an apparatus for securing the internal rotational components of a disk drive comprises an annular clamp retention device. The clamp retention device has a rigid, metallic, main ring body from which protrudes a plurality of compliant tabs having a generally L-shaped cross-section. The compliant tabs extend radially inward from the body to form an inner circular array of the tabs. In addition, a plurality of rigid planar flanges, which are larger than the compliant tabs, extend radially outward from the body. The compliant tabs are designed to engage the hub and cartridge of the disk drive rotational components at the upper end of the disk stack. In the preferred embodiment, the clamp retention device is assembled with a snap-fit without the need for additional fasteners, and thereby reduces the disk of contamination to the sensitive disk drive components.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PREFERRED EMBODIMENT

Figure 1:
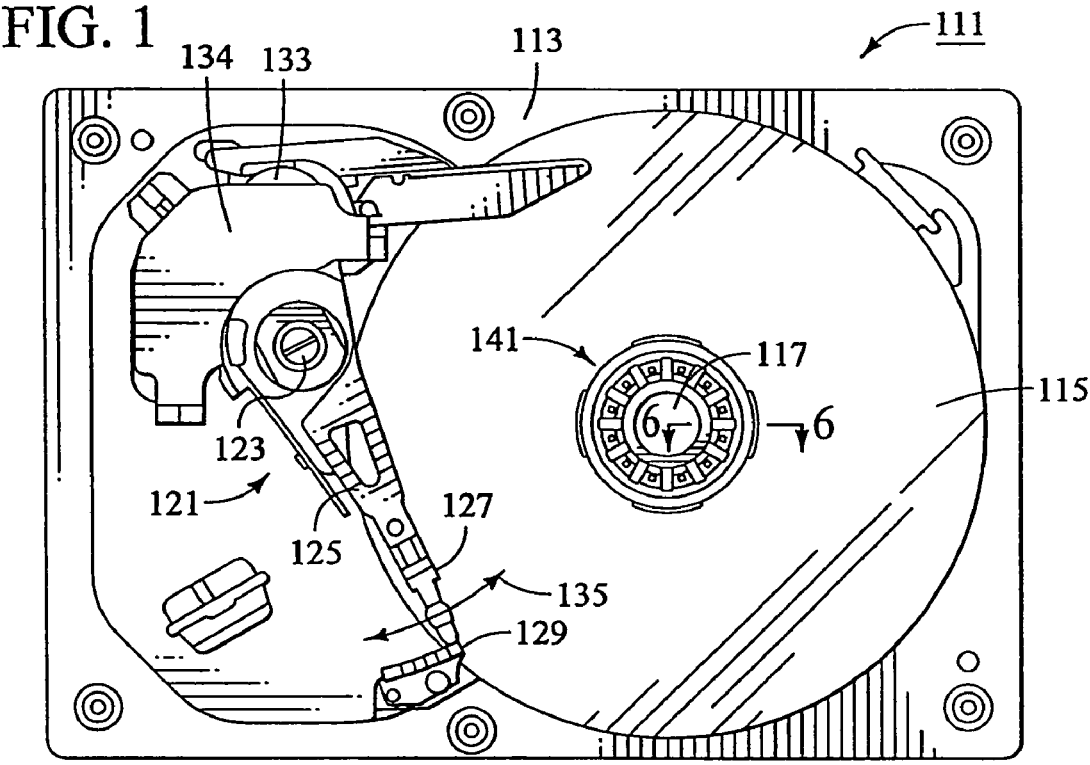
FIG. 1 is a schematic plan view of a disk drive and clamp retention device constructed in accordance with the present invention.
Figure 2:
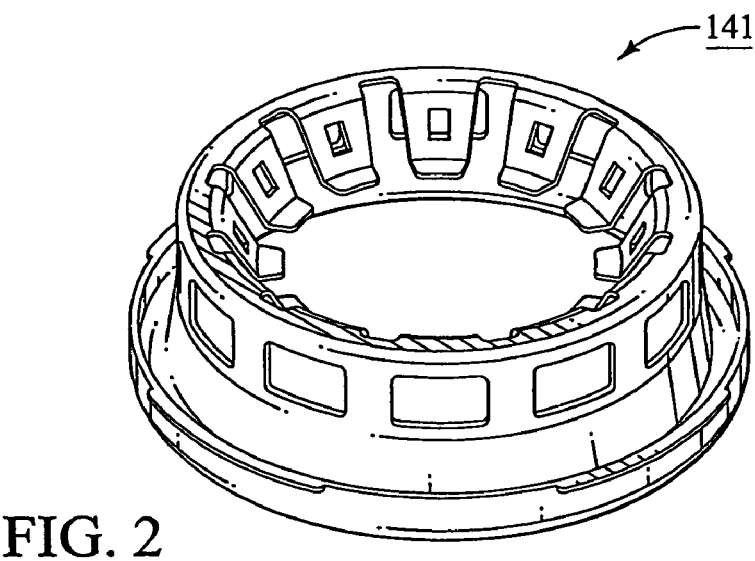
FIG. 2 is an enlarged isometric view of the clamp retention device of FIG. 1.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive cartridge or spindle 117. An actuator 121 comprises a plurality of parallel actuator arms 125 (one shown) in the form of a comb that is pivotally mounted to base 113 about a pivot assembly 123. A controller (not shown) is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. The slider is usually bonded to the end of suspension 127. Head 129 is typically pico size (approximately 1250×1000×300 microns) and formed from ceramic or intermetallic materials. Head 129 also may be nano size (approximately 2050× 1600×450 microns) and is pre-loaded against the surface of disk 115 (in the range two to ten grams) by suspension 127.

Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by the controller moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Referring now to FIGS. 2–5, one embodiment of a clamp retention device 141 constructed in accordance with the present invention is shown. Device 141 is an apparatus for securing the internal rotational components of disk drive 111, specifically the disks 115 to spindle 117. Device 141 comprises a ring-like or annular metallic clamp (preferably spring steel) with an intricate geometry. Device 114 has a rigid, continuous ring body 143 with an annular, upward-turned (concave up), continuous lip or rim 145 that circumscribes body 143 and extends radially outward therefrom. A plurality of discrete rigid, planar flanges 147 (four shown) protrude horizontally from the upper end of rim 145 a short distance. Flanges 147 are generally rectangular but slightly arcuate in shape and may be symmetrically spaced apart from each other.

Figure 3:
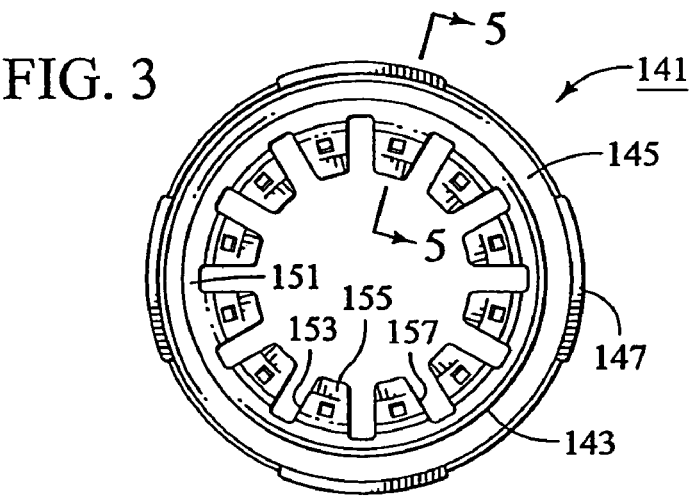
FIG. 3 is a top view of the clamp retention device of FIG. 2.
Figure 4:
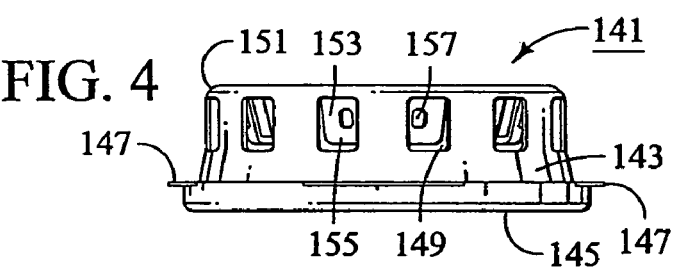
FIG. 4 is a side view of the clamp retention device of FIG. 2.
Figure 5:
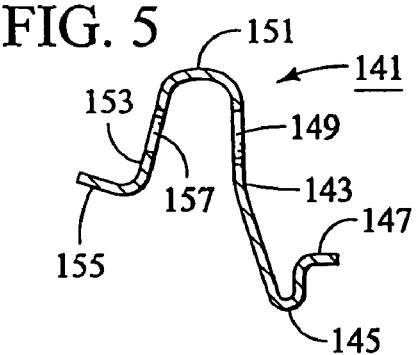
FIG. 5 is a sectional view of the clamp retention device of FIG. 2 taken along the line 5—5 of FIG. 2.

As best shown in FIG. 4, body 143 of device 141 also has a plurality of generally rectangular windows or apertures 149 (twelve in the embodiment shown) that extend therethrough. A downward-turned (concave down), continuous lip or rim 151 is located at the upper end of body 143. Like rim 145, rim 151 circumscribes body 143, but rim 151 extends radially inward from body 143. In addition, a plurality of discrete, generally rectangular, compliant tabs 153 extend downward and slightly radially inward from upper rim 151 in a symmetrical array. Each compliant tab 153 has a generally L-shaped cross-section with a small, inward-turned flange 155 at its lower end. Each compliant tab 153 also has a small rectangular opening 157 that extends through it. The compliant tabs 153 extend radially inward from the body 143 to form an inner circular array of tabs 153, as shown in FIG. 3.

Figure 6:
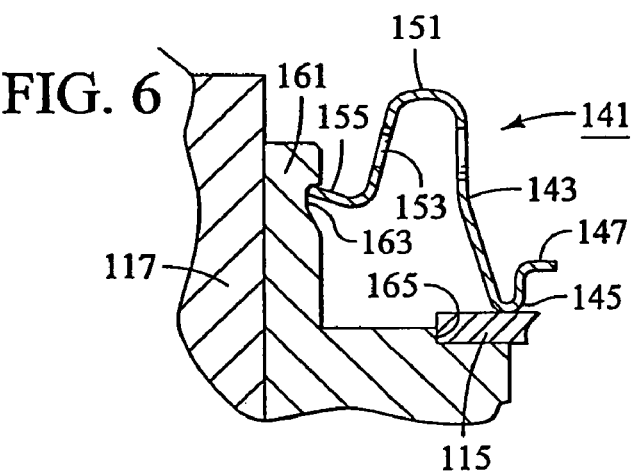
FIG. 6 is a sectional view of an upper end of a spindle of the disk drive of FIG. 1 and the clamp retention device of FIG. 2 taken along the line 6—6 of FIG. 1.

In operation (FIGS. 1 and 6), clamp retention device 141 is used to retain at least the uppermost disk 115 to the cartridge or spindle 117 and, ideally, the entire disk stack. As shown in the enlarged view of FIG. 6, the radially outer surface of spindle 117 includes a cylindrical hub 161 having a notched, circumferential shoulder 163 in its outer surface. Hub 161 also has a seat 165 for locating and securing the radially inner edge and lower surface of the uppermost disk 115. During assembly of disk drive 111, an assembler orients device 141 in the position of FIG. 4, and pushes device 141 down over the top of spindle 117. As device 141 is lowered, the compliant tabs 153 are designed to snap into shoulder 163 and engage hub 161 to secure the disk drive rotational components at the upper end of the disk stack. The lower rim 145 presses securely downward on the upper surface of uppermost disk 115 to retain it in seat 165.

One advantage of the present invention is that the angular length of the planar flanges 147 may be varied in order to create an intentional imbalance in device 141. For example, if the three flanges 147 at the top, bottom, and right side of FIG. 3 had the same angular length, but the flange 147 on the left side of FIG. 3 was shorter in angular length than the other three, the center of gravity of device 141 would be shifted slightly to the right of center to create the intentional imbalance. Thus, when device 141 is installed on disk drive 111, this imbalance could be used to offset an imbalance that is present in the disk stack of the disk drive.

The present invention has several other advantages. In the preferred embodiment, the clamp retention device is assembled with a snap-fit without the need for additional fasteners, such as screws, and thereby reduces the disk of contamination to the sensitive disk drive components. Moreover, this design requires less assembly time (approximately 5 seconds or less, compared to 30 seconds or more with conventional methods) and simpler tools to complete the disk drive. In addition, this design can be readily removed and reused, and is less expensive than conventional retention mechanisms. The scheme for balancing this design is configured into the part, rather than having to compensate for additional fasteners and their relative positions. As an added benefit, the material used to form the clamp retention device can be adjusted to be compatible with the mechanical properties (e.g., thermal, galvanic, etc.) of the mating parts.

While the invention has been shown or described in only some of its forms, it should be apparent to those skilled in the art that it is not so limited, but is susceptible to various changes without departing from the scope of the invention.

What is claimed is:
1. A clamp retention device for securing a disk of a disk drive to a rotational spindle, comprising:
   an annular body;
   a first rim circumscribing one end of the body and extending radially outward from the body;
   a second rim circumscribing an opposite end of the body and extending radially inward from the body; and
   a plurality of compliant tabs extending from the second rim, each tab having a flange protruding from a distal end.

2. A disk drive sub-assembly, comprising:
a rotational spindle having a circumferential shoulder in an outer surface and a seat;
a disk having a radial inner edge located in the seat;
a snap-fit, clamp retention device for securing the disk to the rotational spindle; wherein the clamp retention device comprises:
an annular body;
a first rim circumscribing one end of the body and extending radially outward from the body, wherein the disk is located between the first rim and the seat in the spindle;
a second rim circumscribing an opposite end of the body and extending radially inward from the body; and
a plurality of compliant tabs extending from the second rim, each tab having a flange protruding from a distal end into the shoulder in the spindle.

3. A disk drive subassembly, comprising:
a spindle having a seat and a circumferential shoulder in an outer surface;
a disk having a radial inner edge located in the seat;
a clamp retention device for securing the disk to the spindle; the clamp retention device comprising:
an annular body;
a first rim circumscribing one end of the body and extending radially outward from the body, such that the disk is located between the first rim and the seat in the spindle;
a second rim circumscribing an opposite end of the body and extending radially inward from the body; and
a plurality of compliant tabs extending radially inward from the second rim and having a distal end; and
each tab having a flange protruding radially inward away from a respective one of the distal ends into the shoulder in the spindle.

* * * * *